United States Patent [19]

Kersey et al.

[11] Patent Number: 5,440,414
[45] Date of Patent: Aug. 8, 1995

[54] ADAPTIVE POLARIZATION DIVERSITY DETECTION SCHEME FOR COHERENT COMMUNICATIONS AND INTERFEROMETRIC FIBER SENSORS

[75] Inventors: Alan D. Kersey, Springfield, Va.; Michael J. Marrone, Severna Park, Md.

[73] Assignee: The United States of America as represented by the Secretary of the Navy, Washington, D.C.

[21] Appl. No.: 473,807

[22] Filed: Feb. 2, 1990

[51] Int. Cl.$^6$ .................................................. G02B 5/30
[52] U.S. Cl. .................................... 359/122; 359/250; 359/256; 359/278; 359/494; 250/227.17; 385/11
[58] Field of Search ............... 350/371, 373, 374, 400, 350/401, 403, 404, 405; 455/616, 619; 359/122, 123, 494, 495, 497, 250, 256, 278; 305/11; 250/227.17

[56] References Cited

U.S. PATENT DOCUMENTS

| | | | |
|---|---|---|---|
| 4,563,639 | 1/1986 | Langeac | 350/374 |
| 4,805,977 | 2/1989 | Tamura et al. | 359/122 |
| 4,968,110 | 11/1990 | Bulmer et al. | 359/246 |

FOREIGN PATENT DOCUMENTS

| | | | |
|---|---|---|---|
| 0144723 | 7/1985 | Japan | 359/246 |
| 0156024 | 7/1986 | Japan | 359/281 |
| 2184253 | 6/1987 | United Kingdom | 359/246 |
| 8702787 | 5/1987 | WIPO | 350/400 |
| 8802127 | 3/1988 | WIPO | 350/403 |

OTHER PUBLICATIONS

Kersey, "Input—Polarisation Scanning Technique for Overcoming Polarisation—Induced Signal Fading in Interferometric Fiber Sensors", Electronics Letters, 21 Jul. 1988, pp. 931–933.

Okoshi, "Polarization—State Control Schemes for Heterodyne or Homodyne Optical Fiber Communications", Journal of Lightwave Technology, 6 Dec. 1985, pp. 1232–1236.

Ulrich, "Polarization Stabilization on Single—Mode Fiber", Applied Physics Letters, 1 Dec. 1979, pp. 840–842.

Kersey et al., "Elimination of Polarization Induced Signal Fading in Interferometric Fiber Sensors Using Polarization Control", (Proceedings) 1988 Technical Digest Series, vol. 2, Part 1, (Conference) 27 Jan. 1988.

Creaner et al., "565 Mbit/s Optical PSK Transmission System With Endless Polarisation Control", Electronics Letters, 3 Mar. 1988, pp. 270–271.

Kersey et al., "Adaptive Polarisation Diversity Receiver Configuration for Coherent Optical Fibre Communications", Electronic Letters, 16 Feb. 1989, pp. 275–276.

Kersey et al., "Adaptive Polarization Diversity Detection: Application to Coherent Communications and Interferometric Fiber Sensors", Proceedings, vol. 1, Regular Papers, 10 Sep. 1989, pp. 376–379.

Abbas et al; "A Dual—Detector Optical Heterodyne Receiver for Local Oscillator Noise Suppression" Journal of Lightwave Tech. vol. Lt—3 No. 5 Oct. 1985 pp. 1110–1121.

Hodgkinson et al; "Demodulation of Optical DPSK Using In—Phase and Quadrature Detection", Electronic Letters; Sep. 1985, vol. 21; No. 19, pp. 867–868.

Primary Examiner—Ricky D. Shafer
Attorney, Agent, or Firm—Thomas E. McDonnell; Charles J. Stockstill

[57] ABSTRACT

A method and apparatus for overcoming polarization induced signal fading in both heterodyne communication and interferometric sensing. An adjustable birefringent element in series with a linear-polarization beam splitter forms an elliptical-polarization beam splitter. The birefringent element controllably evolves the states of polarization of two input signals thereby controlling the power contribution of each signal onto the orthogonal axes used by the linear beam splitter. When the states of polarization are evolved such that there are equal signal to reference power ratios on the beam splitter axes, subsequent detectors generate a constant, optimum amplitude signal without the need for weighting or decision circuits.

4 Claims, 6 Drawing Sheets

ADAPTIVE POLARIZATION DIVERSITY DETECTION SCHEME FOR COHERENT COMMUNICATIONS AND INTERFEROMETRIC FIBER SENSORS

BACKGROUND OF THE INVENTION

The present invention relates to the polarization induced signal fading of optical signals and particularly to an apparatus and method for minimizing the fading.

Mixing between a reference signal and a data signal is often necessary to extract information from an optical carrier. In communication, the mixing is typically between the received signal and a local oscillator signal at a different frequency. The result is an intermediate frequency (IF) that can be demodulated. In interferometric sensing, the mixing would be between a reference signal and a signal whose phase has been modified by the parameter being measured. The result is an interference signal. In both communication and interferometric sensing, amplitude of the mixed output is dependant upon efficiency of the mixing between the two input optical signals.

When two signals have the same state of polarization, their mixing is 100% efficient; when two signals have orthogonal polarization states, no mixing occurs. Between these two limits, only that portion of the signals whose states of polarization resolve onto a single axis undergo mixing. The reduction in the amplitude of the mixed signal due to an unmixed component in an orthogonal state of polarization is termed polarization induced fading.

The present art uses polarization diversity to overcome polarization induced fading in communication applications. A stable reference signal is equally divided between orthogonal axes. One method of accomplishing this is by aligning the state of polarization of a laser at 45° to the orthogonal axis of a linear-polarization beam splitter. A random state of polarization input is resolved onto the orthogonal axes of the beam splitter. The signal is divided between horizontal and vertical channels, each of which contains equal amounts of reference light: the resolved signal components mix with the reference components and no signal fading occurs.

This solution, while overcoming the polarization induced fading, creates new problems. Because the signal is resolved onto the orthogonal axes as a function of the arbitrary input state of polarization while the reference signal is equally divided between the axes, the mixed signals from the two orthogonal axes do not sum to an optimum signal. Weighting or decision circuits are used to combine the signals from the two channels. Also, the arbitrary state of polarization of the input may align with one of the reference axes. If this occurs, the optical detector for the orthogonal channel will receive nothing but reference light: shot noise from this detector degrades the system signal-to-noise ratio.

In the case of applications to fiber interferometers, the state of polarization of the light in both fibers is arbitrary and varies over time. Therefore, the polarization diversity technique devised for communication applications, i.e., of equally dividing the reference light, cannot be used for interferometric sensor applications. Polarization masking provides some advantages: e.g., masking using axes at 0°, 60°, and −60° assures that an interference signal is always present. However, because the measurement and reference lights are equally divided among the axes, the maximum output available is only one third of the input signal even if an individual axis is optimized.

OBJECTS OF THE INVENTION

Accordingly, it is an object of this invention to provide an improved apparatus and method for minimizing polarization induced fading in optical mixing.

Another object of the invention is to provide a method and apparatus for minimizing polarization induced fading where the signals within the orthogonal channels sum to an optimum output thereby eliminating the need for further decision or weighting circuitry.

Another object of the invention is to provide a method and apparatus for minimizing polarization induced fading where the ratio of signal to noise is optimized.

A further object of this invention is to provide an apparatus and method of minimizing polarization induced fading capable of use in such diverse applications as heterodyne communication and interferometric sensing.

SUMMARY OF THE INVENTION

These and other objects are achieved by providing an elliptical-polarization beam splitter comprising an adjustable birefringent element in series with a linear-polarization beam splitter. The birefringent element evolves the state of polarization of all components of the input signal. By selectively controlling the state of polarization of the light delivered to the linear-polarization beam splitter, control is obtained over the power of each signal input resolved onto the orthogonal outputs of the beam splitter. When the composite input consists of a reference signal and a data signal, each with a random state of polarization, the invention allows the states of polarization to be evolved such that there are equal signal to reference power ratios in the orthogonal, beam splitter outputs. Having equal power ratios in the outputs allows detectors to generate an optimum amplitude signal without the need for weighting or decision circuits. By placing the adjustable birefringent element under feedback control, a substantially constant amplitude output is developed regardless of the input states of polarization. Further, because the method is not dependant upon equally dividing the reference signal between the two axes, reasonable changes in the elements can be accomplished without requiring realignment.

These and other objects, advantages, and features of the invention will be apparent from the following description of the embodiments and from the accompanying drawings.

DESCRIPTION OF THE PREFERRED EMBODIMENT

Figure 1A:
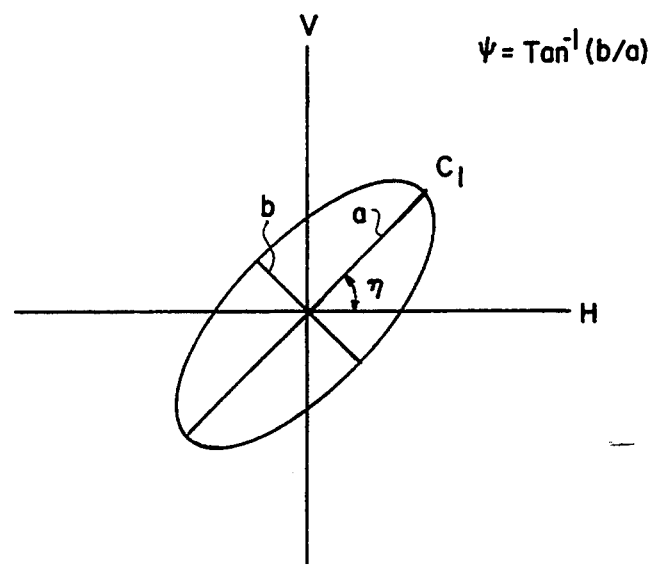
FIG. 1A is a planar representation of a state of polarization.

Referring now to the drawings wherein like numerals denote like elements throughout the several views, and in particular to FIG. 1 which shows display and labeling conventions for states of polarization within a Poincaré sphere presentation.

FIG. 1a is a planar display of the elliptical state of polarization of a propagating field. H and V are spatial axes in a plane normal to the direction of propagation of the field. H is an arbitrary axes nominally labeled as the Horizontal state of polarization. V, the nominal vertical state of polarization axis, is orthogonal to H. The state of polarization of the propagating field is represented by ellipse $C_1$ with major and minor axes a and b respectively. Angle $\psi$ can be calculated to describe the ellipticity of state of polarization $C_1$: $\psi = \text{Tan}^{-1}(b/a)$ where $b < a$. Thus, $\psi$ varies from $-\pi/4$ to $\pi/4$. Major axis a is aligned at a positive angle $\eta$ from horizontal state of polarization H. States where $\eta$ differs by 180° are not distinguishable; thus, $\eta$ varies from 0 to $\pi$. Angles $\eta$ and $\psi$ uniquely describe state of polarization $C_1$ within reference system H, V. If elliptical signal $C_1$ is resolved onto orthogonal axes H, V, the projected components will be functions of both angle of alignment, $\eta$, and ellipticity $\psi$, which is itself a function of the ratio of axes a and b.

Figure 1B:
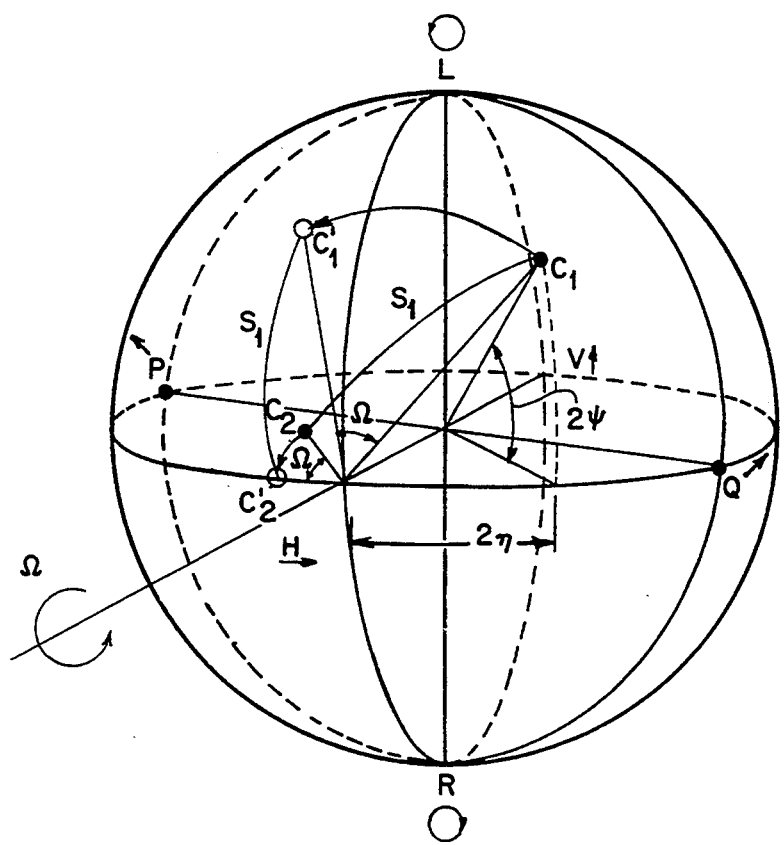
FIG. 1b is a Poincaré Sphere diagram showing labeling conventions and rotation of states of polarization.

FIG. 1b is a Poincaré sphere graphic representation of state of polarization $C_1$ from FIG. 1a. Within the sphere, angles are displayed at twice their values within a cartesian system: thus, orthogonal cartesian axes display along a single diameter in the Poincaré sphere. Horizontal state of polarization and vertical state of polarization axes H, V of the cartesian system are shown within the sphere as an axis through H, V. Point H represents a state of horizontal polarization; V, vertical polarization. Points P, Q, being midway between horizontal and vertical states of polarization H, V, represent linear states of polarization at ±45°. Point L represents a left hand circularly polarized state; point R, a right hand circularly polarized state. Great circle HQVP, being equidistant from left and right hand circular states L, R, represents the linear states of polarizations with $\eta$ ranging from 0° to 180°.

Within the Poincaré sphere, angle of alignment $\eta$ is displayed by angle $2\eta$ counterclockwise from state of horizontal polarization H towards Q. Degree of ellipticity $\psi$ is displayed by angle $\psi$ from the linear-polarization plane of great circle HQVP. The resulting point is labeled as state of polarization $C_1$. Display angles $2\psi$ and $2\eta$ uniquely describe a point on the surface of the Poincaré sphere; thus, there is a one to one correlation between the states of polarization and the points displayed on the sphere.

A second arbitrary state of polarization $C_2$ is shown on the sphere. States of polarization $C_1$, $C_2$ are connected by arc segment $S_1$. If states of polarization $C_1$, $C_2$ continue to evolve by transmission through a polarization sensitive medium, their states of polarization change. As their states of polarization evolve, their placement on the Poincaré sphere changes. However, regardless of where they move on the sphere, states of polarization evolving from $C_1$, $C_2$ through the same polarization sensitive medium are always separated by arc segment $S_1$.

The net evolution in the states of polarization can always be represented by a single rotation about some point on the Poincaré sphere. FIG. 1b demonstrates the effect of rotation by an arbitrary angle $\Omega$ about horizontal state of polarization H. State of polarization $C_1$ is rotated angle $\Omega$ about H to state of polarization $C_1'$. $C_2$ is rotated to $C_2'$. Because $C_1$ and $C_2$ are not the same distance from H, equal angular rotations move them different distances on the surface of the sphere. However, because $C_1$ and $C_2$ went through the same evolution, rotation $\Omega$, they are still separated by arc segment $S_1$.

Figure 2A:
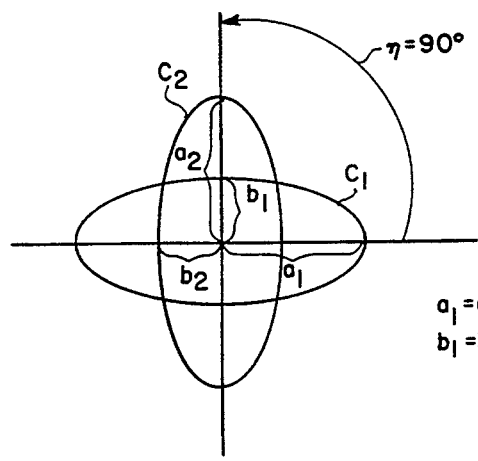
FIG. 2a is a planar representation of orthogonal elliptical states of polarization.

FIG. 2 shows a Poincaré sphere rotation and a new method and apparatus to achieve the resulting evolution in the states of polarization. FIG. 2a shows two orthogonal, elliptical states of polarization $C_1$, $C_2$ with equal major axes, $a_1 = a_2$, and equal minor axes, $b_1 = b_2$. Thus, $\psi_1 = \psi_2 = \text{Tan}^{-1}(b/a)$. Major axis $a_1$ of elliptical state $C_1$ is aligned with horizontal polarization axis H: $\eta_1 = 2\eta_1 = 0°$. Major axis $a_2$ of elliptical state $C_2$ is aligned with vertical polarization axis V: $\eta_2 = 90°$ and $2\eta_2 = 180°$.

Figure 2B:
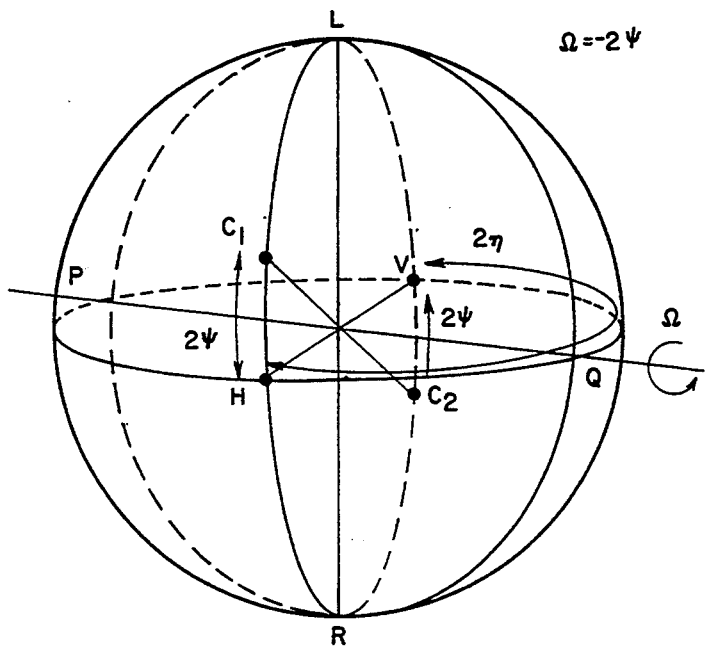
FIG. 2b is a Poincaré sphere diagram showing rotation of orthogonal elliptical states of polarization.

FIG. 2b shows the Poincaré sphere display of states of polarization $C_1$, $C_2$: $2\eta_1$, $2\psi_1$ is displayed as $C_1$; $2\eta_2$, $2\psi_2$ is displayed as $C_2$. Because angles are displayed at twice their cartesian values, orthogonal states of polarization $C_1$, $C_2$ are displayed at opposite ends of a diameter of the sphere. If points $C_1$, $C_2$ are rotated on the sphere by an angle $\Omega = -2\psi$ about an axis through points P, Q, evolved state $C_1'$ will be coincident with horizontal state of polarization H, and $C_2'$, with vertical state, V.

Figure 2C:
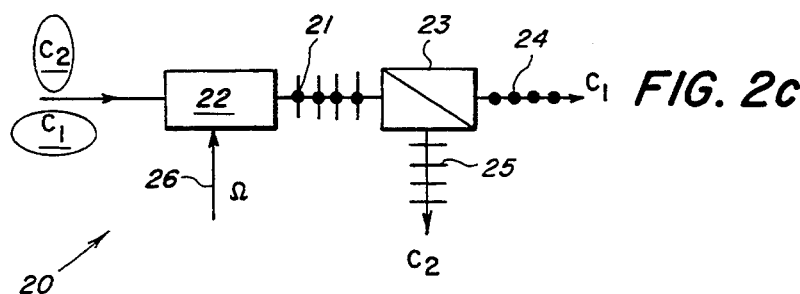
FIG. 2c is a schematic representation of an apparatus to controllably evolve orthogonal elliptical inputs.

FIG. 2c shows an elliptical-polarization beam splitter 20. Control means 26 is applied to adjustable birefringent element 22 to adjust the birefringence presented to input optical signals $C_1$, $C_2$. The birefringent axes of adjustable birefringent element 22 are aligned at ±45° to the orthogonal axes of linear-polarization beam splitter 23. The output of beam splitter 23 consists of two orthogonal, linearly polarized components 24, 25.

In operation, birefringent element 22 is adjusted to provide an evolution that equates to a rotation of magnitude $\Omega = -2\psi$ as determined in FIG. 2b. Because the birefringent axes of element 22 are aligned at ±45° to the orthogonal axes of linear beam splitter 23, this equals rotation on the Poincaré sphere around an axis through P, Q. Evolution $\psi$ converts elliptical inputs $C_1$, $C_2$ to linear states of polarization aligned with the orthogonal axes of beam splitter 23. Light from elliptical input $C_1$ is output on horizontal output 24; light from elliptical input $C_2$ is output on vertical output 25. Thus, combination 20 of adjustable birefringent element 22 and linear-polarization beam splitter 23 functions as an elliptical-polarization beam splitter capable of separating signals from orthogonal elliptical inputs into orthogonal linearly polarized outputs.

FIG. 3 shows the impact of an elliptical-polarization beam splitter on arbitrary elliptical inputs that are not aligned on orthogonal axes.

Figure 3A:
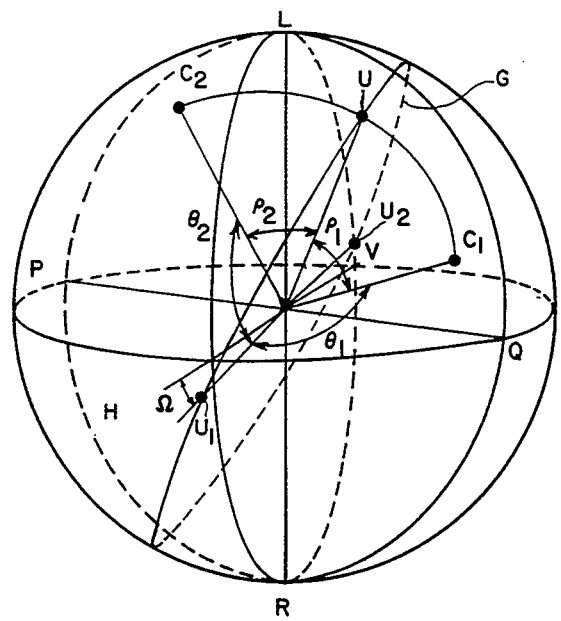
FIG. 3a is a Poincaré sphere analysis.

FIG. 3a is a generalized Poincaré sphere. Input signals $C_1$ and $C_2$ have arbitrary states of polarization. Point U is the midpoint of the arc segment between $C_1$ and $C_2$. Angle $O_1$ is subtended by arc $C_1$–U; angle $p_2$ is subtended by arc $C_2$–U. $u_1$ and $u_2$ are intercepts between great circle HLVR and a great circle G through U. Angle $\theta_1$ is subtended by arc $C_1$–$u_1$; angle $\theta_2$ is subtended by arc $C_2$–$u_1$. An axis through $U_1$, $U_2$ is separated from an axis through H, V by angle $\Omega$.

Because U is equidistant from $C_1$ and $C_2$, angles $p_1$ and $p_2$ must be equal. A great circle G through U can be uniquely selected such that all points on G are equidistant from $C_1$ and $C_2$. Angles subtended from any point on G to $C_1$ and the same point on G to $C_2$ must therefore be equal. Any two great circles on a sphere must intersect at two unique points, and the intercepts must lie on a diameter of the sphere. Here great circle HLVR intersects great circle G at points $u_1$, $u_2$. Because point U1 is on G equidistant from $C_1$ and $C_2$, $\theta_1$ must equal $\theta_2$. In a similar fashion, angles subtended by $C_1$–$u_2$ and $C_2$–$u_2$ must also be equal.

Thus, FIG. 3a shows that for every pair of arbitrary input states of polarization $C_1$, $C_2$, there must exist a unique diameter $u_1$–$u_2$ on great circle HLVR such that equal angles $\theta_1$, $\theta_2$ are subtended between $C_1$, $C_2$ and $u_1$, and equal angles are subtended between $C_1$, $C_2$ and $u_2$. Because the fraction of the power projected onto axes $U_1$, $U_2$ is given by $\cos^2(\theta_1/2)$ and $\cos^2(\theta_2/2)$, and $\theta_1 = \theta_2$, the power contribution of $C_1$ on $U_1$ is equal to the power contribution of $C_2$ on $U_1$. Similarly, the power contributions from $C_1$, $C_2$ on $U_2$ are equal.

Figure 3B:
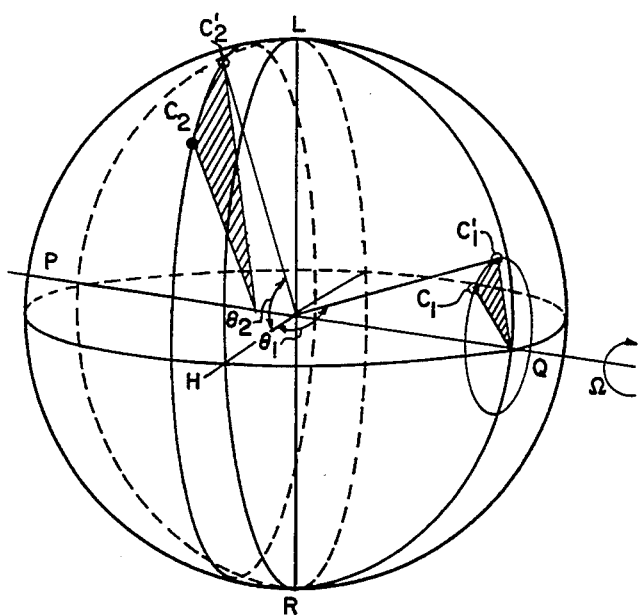
FIG. 3b is a Poincaré sphere diagram showing rotation of arbitrary states of polarization.

FIG. 3b is a Poincaré sphere rotation. $C_1$ is rotated an angle $\Omega$ about an axis through P, Q. Rotation $\Omega$ evolves state of polarization $C_1$ to state of polarization $C_1'$; $C_2$ evolves to state $C_2'$. After rotation $\Omega$, equal angles $\theta_1$, $\theta_2$ are subtended between states of polarization $C_1'$, $C_2'$ and horizontal state of polarization H. After rotation $\Omega$, new great circle G' intersects great circle HLVR at $U_1'$, $U_2'$ where $U_1'$ coincides with H and $U_2'$ coincides with V. Therefore, signals represented by input states of polarization $C_1$, $C_2$ after evolution to $C_1'$, $C_2'$ are resolved onto axes H and V in equal power ratios.

Figure 3C:
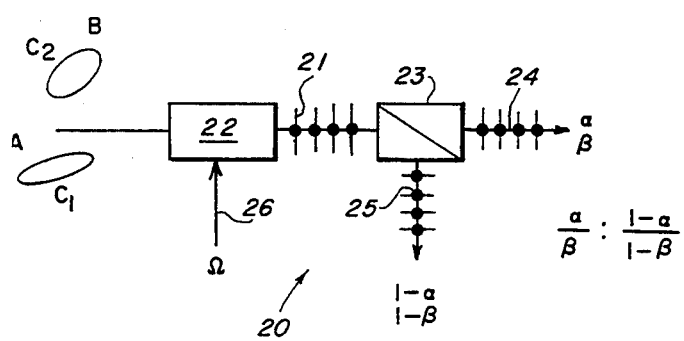
FIG. 3c is a schematic representation of an elliptical polarization beam splitter according to the invention.

FIG. 3c is a schematic representation of elliptical-polarization beam splitter 20. Inputs A, B have states of polarization $C_1$, $C_2$ respectively. Control 26 adjusts birefringent element 22 to a birefringence that provides an evolution that equates to rotation $\Omega$. Linear-polarization beam splitter 23 passes fraction $\alpha$ of the light from input A to horizontal output 24; fraction $1-\alpha$ is passed to vertical output 25. Fraction $\beta$ of the light from input B is passed to horizontal output 24; fraction $1-\beta$ is passed to vertical output 25. Because birefringent element 22 is aligned at 45° to the orthogonal axes of linear-polarization beam splitter 23, the evolution of states of polarization within 22 equates to a rotation about an axis through P, Q on a Poincaré sphere. Because of the method by which rotation $\Omega$ was determined, signals A, B are being resolved over equal angles and thus fractions $\alpha$ and $\beta$ are equal.

Figure 4:
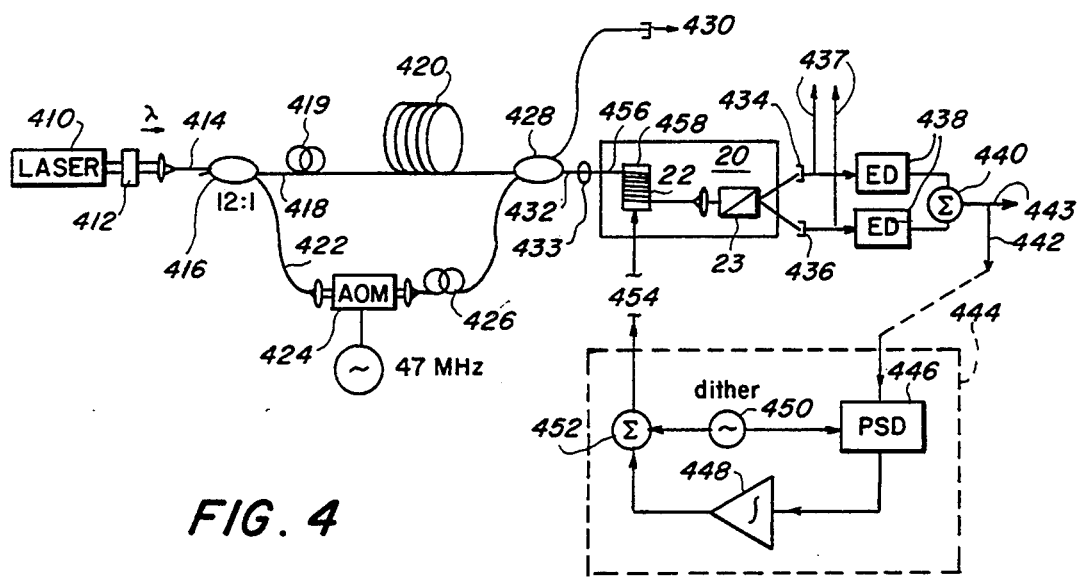
FIG. 4 is a schematic representation of an apparatus that demonstrates the application of an elliptical-polarization beam splitter to heterodyne communications.

FIG. 4 is a schematic representation of an apparatus that demonstrated application of an elliptical-polarization beam splitter to heterodyne communications. Unless specified otherwise, all fibers are conventional, low-birefringence fibers. Laser 410 injects light of wavelength λ through isolator 412 into input fiber 414. Optical combiner 416 divides the light into fibers 418 and 422. Signal fiber 418 is looped to form polarization controller 419 and delay coil 420. Reference fiber 422 goes through acoustic-optical modulator 424 where a frequency offset is added. Reference fiber 422 is looped to form polarization controller 426. Fibers 418 and 422 are inputs to optical combiner 428. Output fiber 430 is available for direct measurement. Output fiber 432 connects combiner 428 to splice 433. Splice 433 joins fiber 432 to high-birefringent fiber 456 which is input into elliptical-polarization beam splitter 20 comprising birefringent element 22 and linear-polarization beam splitter 23. Birefringent element 22 comprises a high-birefringence optical fiber 456 wound around a piezoelectric fiber stretcher 458. Optical outputs from beam splitter 23 are converted to electric signals by detectors 434, 436. Outputs from detectors 434 and 436 are brought out at 437 and made available for demodulation. Outputs from detectors 434, 436 are also input to parallel envelope detectors 438, whose outputs are combined by summer 440. Summed output 442 is made available for measurement at 443 and is also input to feedback electronics 444. Electronic feedback circuit 444 comprises phase sensitive detector 446 whose output is input to integrator 448. Summer 452 takes inputs from integrator 448 and from dither source 450. Summer 452 develops control voltage 454 which is applied to adjustable birefringent element 22.

In operation of the demonstration apparatus, delay coil 420 provides a delay longer than the coherence length of laser 410 to better simulate different sources for the reference and data signals. Polarization controllers 419, 426 are manually adjusted to randomize the states of polarization of the light in reference fiber 422 and signal fiber 418. Light in fibers 418, 422 are mixed by combiner 428 and carried by fiber 432 to the detector circuitry. Outputs from elliptical-polarization beam splitter 20 are converted to electronic signals by detectors 434, 436. The detected signals are input to parallel envelope detectors 438 where the signals are demodulated. Depending on the type of modulation on the signal light, the communicated information could be available as output 443 from envelope detectors 438. If output 437 is taken to separate demodulation circuitry, then envelop detectors 438 only perform their function of developing input signal 442 for feedback circuit 444. The outputs of amplifiers 438 are summed by summer 440 and input to feedback circuitry 444 whose output voltage 454 controls birefringent element 22.

The deformation of piezoelectric cylinder 458 is a function of applied voltage 454. The net birefringence of high-birefringent fiber 456 is a function of the physical stretching resulting from the controlled deformation of piezoelectric cylinder 458. Thus, voltage 454 controllably alters the net birefringence of element 22. Element 22 provides an adjustable birefringence to controllably evolve the states of polarization of the reference and signal components of the light in fiber 432. Dither source 450 modulates control voltage 454 and thus the birefringence of element 22 over a small range. Phase sensitive detector 446 takes summed output 442 modulated at the dither frequency. Integrator 448 drives control voltage 454 towards a value where the derivative of the amplitude of signal at 443 with respect to control voltage 454 transitions from positive to negative.

Figure 5:
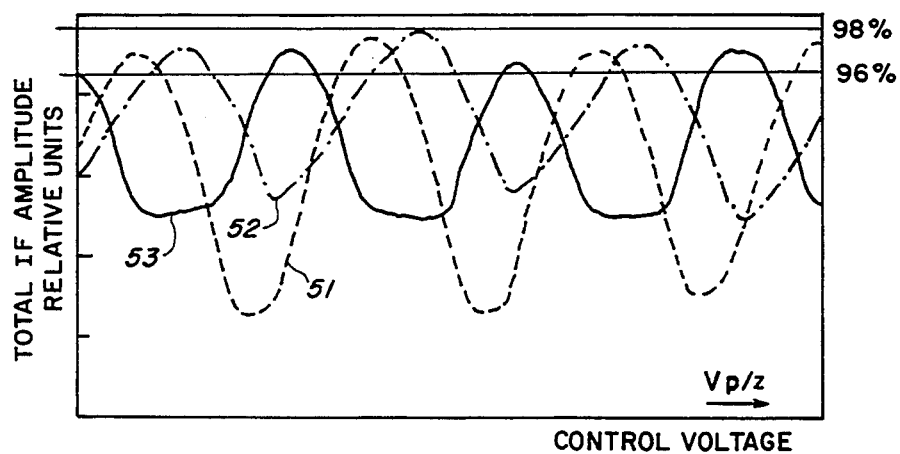
FIG. 5 is a chart of the output signal amplitude from a heterodyne communication device under manual control.

FIG. 5 is a chart of the amplitude of output signal 443 from the heterodyne communication test device of FIG. 4 when control voltage 454 was manually swept over its range. Polarization controllers 419 and 426 were randomly adjusted to generate arbitrary states of polarization in fibers 418, 422. Curves 51, 52, and 53 each show output 443 for one combination of arbitrary states of polarization in fibers 418, 422 over the range of control voltage 454. For each pair of arbitrary input polarization states, there existed a control voltage 454 at which birefringent element 22 adjusted the input states of polarization such that output signal 443 approached 96% to 98% of the optimum maximum output. For any random combination of states of polarization, feedback circuit 444 will drive control voltage 454 to a value where the derivative of the signal transitions from positive to negative; i.e., a peak in output signal 443 v control voltage 454 such as seen in 51, 52, 53.

Figure 6:
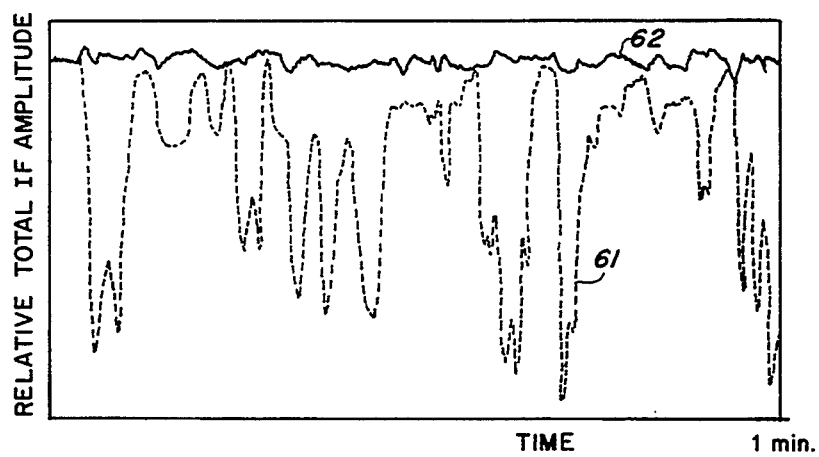
FIG. 6 is a chart of the output signal amplitude from the a heterodyne communication device with electronic feedback.

FIG. 6 is a chart of output signal amplitude from the heterodyne communication test device of FIG. 4 when control voltage 454 was automatically developed by envelop detectors 438 and electronic feedback circuit 444. Curves 61, 62 record a one minute period during which polarization controllers 419 and 426 were manually adjusted to generate random pairs of states of polarization. Curve 61 shows that direct measurement output available at 430 suffered significant polarization induced fading. Curve 62 shows output 443 and demonstrates that elliptical-polarization beam splitter 20 overcame polarization induced fading in heterodyne communication. This control would be effective so long as the response time of the feedback circuit is significantly less than the rate at which the states of polarization are changing, but significantly longer than the period of any amplitude modulation of the light.

Because orthogonal outputs from beam splitter 23 have equal power contributions from the signal and reference signals, the outputs from the parallel envelope detectors 438 sum to an optimum output. Thus, elliptical-polarization beam splitter 20 adapts to incoming states of polarization without requiring selection between horizontal output 434 and vertical output 436 or their weighting. Because light from both signal fiber 418 and reference fiber 422 are resolved onto horizontal and vertical detectors 434, 436 in equal ratios, if the signal light at one detector goes towards zero, so will the reference light at that detector. Thus, optical detectors 434, 436 are not allowed to detect a large reference light without a simultaneous large signal light. This minimizes the total shot noise (also termed photon noise) from detectors 434, 436 thereby improving the signal to noise ratio of the combined output.

While the example embodiments control the birefringence of element 22 by physically stretching the fiber, any other method of controllably altering the birefringence would function. E.g., the photo elastic effect (fiber squeezing), the electro-optic effect, and the Faraday effect are examples of other effects that will controllably adjust the birefringence. Use of other effects to controllably adjust the birefringence may require minor modifications to the system; e.g., for the Faraday effect the rotation would change from an axis around P, Q, to a axis around L, R. Similarly, any feedback circuit capable of driving the derivative of the control voltage towards zero would function. The demonstration apparatus for heterodyne communication did not carry a modulated signal: the test merely drove the adjustable birefringence to the value that generated a maximum amplitude intermediate frequency (IF) signal. Any mode of light modulation would be compatible with the method: e.g., amplitude, frequency, or phase.

Once instructed by the teachings of this specification, identification and solution of the equations to demonstrate that the device develops equal power ratios in the parallel outputs of the elliptical-polarization beam splitter 20—as was demonstrated graphically in FIG. 3—is within the abilities of one skilled in the art of the design of fiber optic interferometric systems. However, the equations are not necessary to understand the operation of the invention as this specification has shown.

Figure 7:
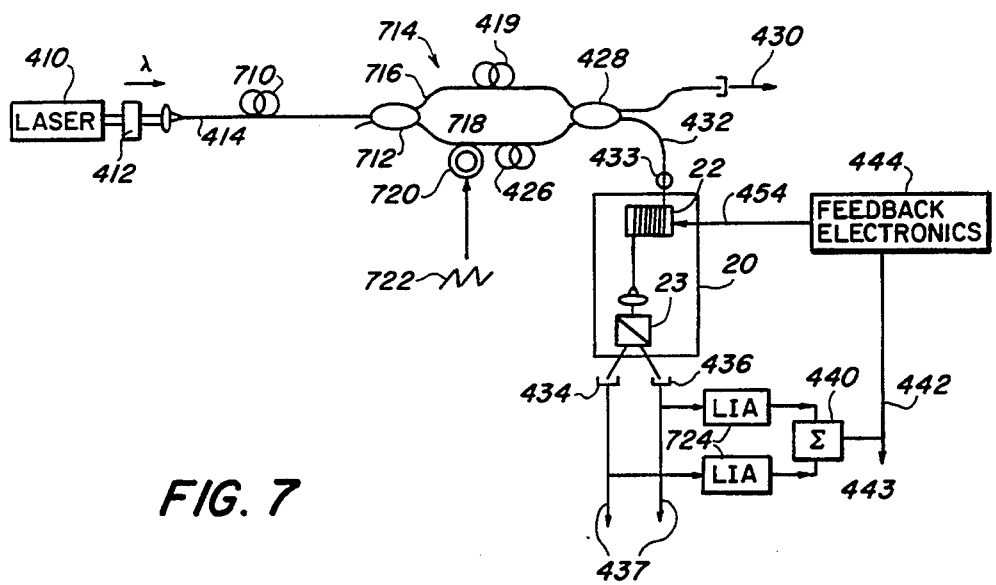
FIG. 7 is a schematic representation of an apparatus that demonstrates the application of an elliptical-polarization beam splitter to interferometric sensing.

FIG. 7 is a schematic representation of an apparatus demonstrating application of an elliptical-polarization beam splitter 20 to interferometric sensing. Unless specified otherwise, all fibers are conventional, low-birefringence fibers. Laser 410 injects light at wavelength λ through isolator 412 into fiber 414 which loops to form polarization controller 710. Fiber 414 connects to optical combiner 712 having two outputs: reference fiber 716 and measurement fiber 718. Reference fiber 716 loops to form polarization controller 419. Measurement fiber 718 is wrapped around piezoelectric fiber stretcher 720 driven by sawtooth voltage 722. Measurement fiber 718 contains loops forming polarization controller 426. Reference fiber 716 and measurement fiber 718 are inputs to optical combiner 428. The elements between optical combiners 712 and 428 form Mach-Zehnder interferometer 714. From combiner 428, output fiber 430 is available for direct measurements. Output fiber 432 connects combiner 428 to splice 433. Splice 433 joins fiber 432 to high-birefringent fiber 456 which is input into elliptical-polarization beam splitter 20 comprising birefringent element 22 and linear-polarization beam splitter 23. The optical and electronic circuits from fiber 432 on are the same as those of FIG. 4 except that parallel lock-in-amplifiers 724 replace parallel envelope detectors 438.

In operation, polarization controller 710 alters the state of polarization of the light in fiber 414. This assures that a favorable output is not dependant on the input state of polarization. For the same reason, polarization controllers 419 and 426 control the states of polarization in fibers 716 and 718. When driven by sawtooth voltage 722, piezoelectric fiber stretcher 720 modulates the phase of the light in fiber 718 over one full cycle, i.e., it modulates the phase by $2\pi$ radians. (Fiber 718 is conventional, low-birefringence fiber; fiber 456, within elliptical-polarization beam splitter 23, is high-birefringence fiber. Therefore, stretching fiber 718 does not change the state of polarization of the light it is carrying; stretching fiber 456 does change the state of polarization of the light that it is carrying.) The signals on the reference fiber 716 and measurement fiber 718 mix in optical combiner 428. The mixed signal in fiber 432 is injected into the detection circuit comprising elliptical-polarization beam splitter 20, detectors 434, 436, parallel lock-in-amplifiers 724 and feedback circuit 444. Lock-in-amplifiers 724 measure the peak to peak amplitude of the interference signal. Other circuits with the same function, e.g., peak-to-peak detectors, would be satisfactory. Operation of these elements is the same as the corresponding elements in FIG. 4.

Figure 8:
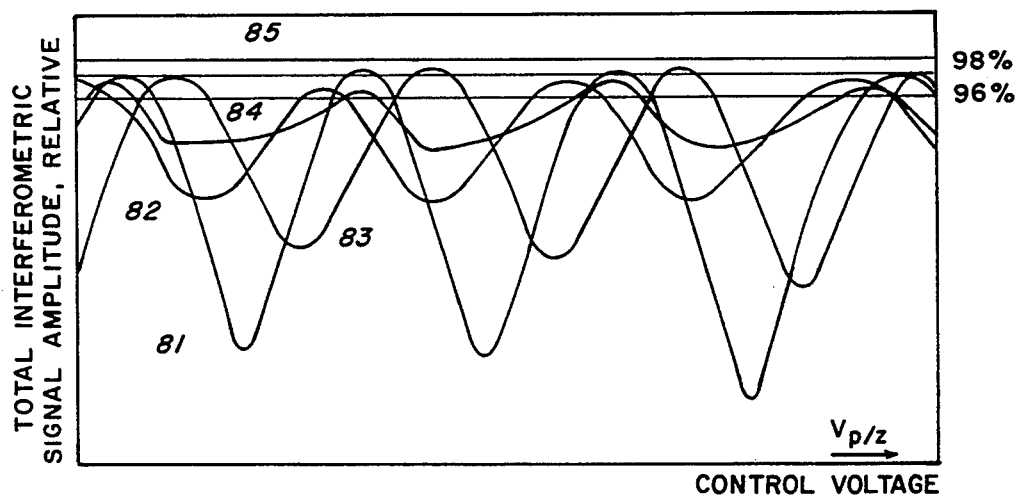
FIG. 8 is a chart of the interference signal amplitude from an interferometric device under manual control.

FIG. 8 is a chart of the total interference signal amplitude at 443 when control voltage 454 was manually swept over its range. The figure charts relative signal amplitude at 443 compared to an optimum signal magnitude. Polarization controllers 710, 419, and 426 were manually adjusted to generate arbitrary states of polarization in fibers 414, 716, 718. The three random states of polarization were held constant while control voltage 454 was manually swept over its range. Curves 81, 82, 83, 84 and 85 represent random combinations of states of polarization in input fiber 414, reference fiber 716, and measurement fiber 718. For each set of arbitrary polarization states, there existed a control voltage 454 at which birefringent element 22 adjusts the states of polarization such that output 443 approached 96% to 98% of the optimum maximum output.

Figure 9:
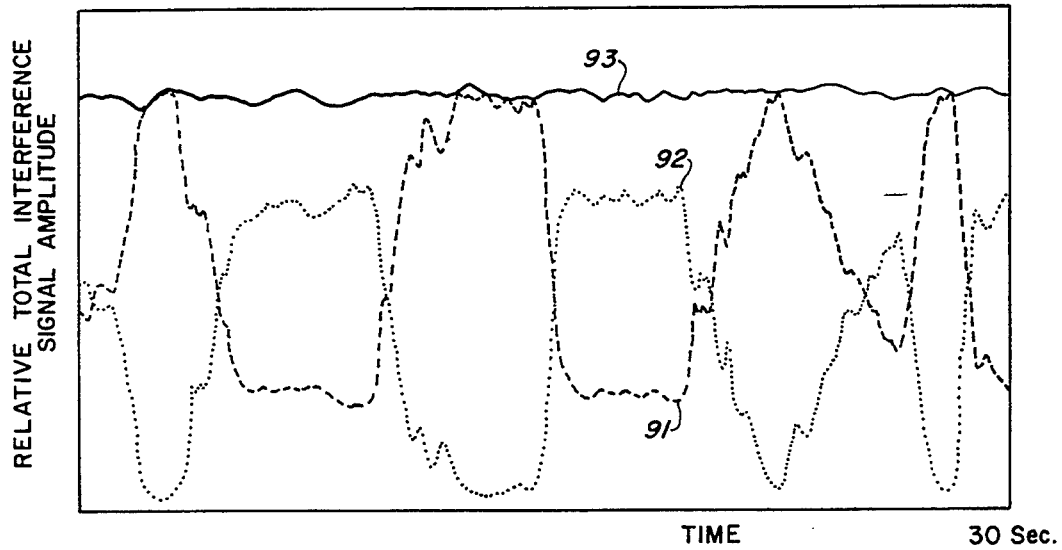
FIG. 9 is a chart of the interference signal amplitude from an interferometric device with electronic feedback.

FIG. 9 is a chart of the output from the test device of FIG. 7 when control voltage 454 was automatically developed by lock-in-amplifiers 724 and electronic feedback circuit 444. Curve 91 plots the interference signal amplitude of detector 434; curve 92, detector 436. Curve 93 plots the combination of detected interference signal amplitudes in output 443. Curves 91, 92, 93 record a thirty second period during which polarization controllers 710, 419 and 426 were manually adjusted to randomize the combination of states of polarization in fibers 414, 716, 718. The changes in states of polarization caused significant polarization induced fading within individual signals as shown by 91 and 92. However, combined output 443 in curve 93 demonstrates that elliptical-polarization beam splitter 20 overcame polarization induced fading in interferometric sensing.

As in the application to heterodyne communication, elliptical-polarization beam splitter 20 adapts to incoming states of polarization without requiring selection between horizontal output 434 and vertical output 436 or their weighting. Because evolution of the state of polarization within birefringent element 22 assures that measurement and reference light in fibers 718, 716 are present in equal ratios at detectors 434, 436, if the measurement light at one detector fades, so will the reference light at that detector. This minimizes shot noise from the detector for a faded channel; the ratio of signal to noise is held constant at the value achieved with perfect polarization matching in a conventional, non-diversity detection system.

It should readily be understood that many modifications and variations of the present invention are possible within the claimed invention. It is therefore to b e understood that, within the scope of the appended claims, the invention may be practiced otherwise than as specifically described.

What is claimed is:

1. The optical system for resolving power from any two optical signals having different polarization states into a pair of preselected orthogonal polarization states; said system comprising:
   a beam splitter;
   a single active adjustable birefringent element in optical series with said beam splitter;
   adjustment means for selectively setting said single active birefringent element to any one of a plurality of birefringence values; and
   means responsive to said optical signals of the different polarization states, for controlling said adjustment means to set said single active birefringent element to a preselected one of said birefringent values effective to cause said single active birefringent element and said beam splitter to cooperate to split substantially a same fraction of power from each output optical signals into one of said pair of preselected orthogonal polarization states.

2. The optical system of claim 1 wherein said single active birefringent element and said beam splitter cooperate to split substantially the same fraction of power $1-\alpha$ from each of said optical signals into the other of said pair of preselected orthogonal polarization states.

3. The optical system of claim 1 wherein said two optical signals of arbitrary polarization states are at substantially equal frequencies.

4. The optical system of claim 1 wherein said two optical signals of arbitrary polarization states are not at substantially equal frequencies.

* * * * *

UNITED STATES PATENT AND TRADEMARK OFFICE
CERTIFICATE OF CORRECTION

PATENT NO. : 5,440,414

DATED : August 8, 1995

INVENTOR(S) : Alan D. Kersey and Michael J. Marrone

It is certified that error appears in the above-identified patent and that said Letters Patent is hereby corrected as shown below:

Title page, Item 75, line 3 after MD. add--: Anthony Dandridge of Alexandria, VA Signed and Sealed this First Day of October, 1996

Attest:

BRUCE LEHMAN

*Attesting Officer*  *Commissioner of Patents and Trademarks*